(12) United States Patent
Nguyen

(10) Patent No.: US 7,827,095 B2
(45) Date of Patent: Nov. 2, 2010

(54) EQUILIBRIUM FLOW BETWEEN ECONOMIC SYSTEMS

(76) Inventor: Tim Hung-Minh Nguyen, 11721 Puryear La., Garden Grove, CA (US) 92840

( * ) Notice: Subject to any disclaimer, the term of this patent is extended or adjusted under 35 U.S.C. 154(b) by 477 days.

(21) Appl. No.: 11/835,369

(22) Filed: Aug. 7, 2007

(65) Prior Publication Data

US 2008/0033854 A1 Feb. 7, 2008

Related U.S. Application Data

(60) Provisional application No. 60/836,431, filed on Aug. 7, 2006.

(51) Int. Cl.
*G06Q 40/00* (2006.01)
(52) U.S. Cl. ............... 705/37; 35/36; 35/37; 35/38
(58) Field of Classification Search ............. 705/35–38
See application file for complete search history.

(56) References Cited

U.S. PATENT DOCUMENTS

| 6,021,397 | A | * | 2/2000 | Jones et al. | 705/36 R |
| 2001/0042785 | A1 | * | 11/2001 | Walker et al. | 235/379 |
| 2003/0093347 | A1 | * | 5/2003 | Gray | 705/35 |
| 2004/0117302 | A1 | * | 6/2004 | Weichert et al. | 705/40 |
| 2005/0010510 | A1 | * | 1/2005 | Brose et al. | 705/35 |

OTHER PUBLICATIONS

Louis Whiteman. American Banker. New York, N.Y.: Dec. 15, 1998. vol. 163, Iss. 238; p. 6) discloses Billy Proffitt, Factors affecting program evaluation behaviours of natural resource extension practitioners in the United States.*

* cited by examiner

*Primary Examiner*—Alexander Kalinowski
*Assistant Examiner*—Clement B Graham
(74) *Attorney, Agent, or Firm*—Mintz, Levin, Cohn, Ferris, Glovsky and Popeo P.C.

(57) ABSTRACT

Computer implemented methods and systems are provided for analyzing equilibrium flow within economic system. Related systems, apparatus, methods, and/or articles are also described.

19 Claims, 3 Drawing Sheets

EQUILIBRIUM FLOW BETWEEN ECONOMIC SYSTEMS

RELATED APPLICATIONS

This application claims the benefit of U.S. provisional patent application Ser. No. 60/836,431, filed on Aug. 7, 2006 and entitled "Equilibrium Flow between Economic Systems," which is incorporated by reference herein in its entirety.

FIELD

The subject matter described herein relates to equilibrium flow between economic systems.

BACKGROUND

Measurement and modeling of economic systems presents a number of difficulties, including, but not limited to explanation of complex theoretical concepts. Theoretical concepts in economics as well as other fields can be much harder to understand than mathematics. Economic theories and methods are often quite abstract and difficult to comprehend for an average person.

SUMMARY

In one aspect, a method includes receiving data related to one or more variables characteristic of an economic system. The one or more variables can include revenue (I), profit/loss (P), expenses (Eo), assets (A), liabilities (L), and equity (Eq) for the economic system. A target variable is selected for analysis, the economic system is analyzed using an equilibrium flow equation $$\left( \frac{I}{P + \sum E_o} = \frac{A}{L + Eq} \right)$$

and one or more results of the analysis are promoted, which can optionally include displaying results of the analysis to a user via a user interface.

In optional variations, an economic impact of an event on one or more economic fundamentals of the economic system can be predicted. The event can optionally change the value of one or more of the one or more variables. The receiving can optionally include receipt of data entered by a user via a user interface in response to one or more prompts. Alternatively, the receiving can optionally include receipt of data conveyed by a machine readable signal or on a machine-readable medium. The data can optionally be supplied from one or more databases that record economic data representative of the economic system. The target variable can optionally be selected for analysis by a user via a user interface. Alternatively the target variable can optionally be selected for analysis by a automated means that optionally makes the selection according to an analysis algorithm, as part of a stochastic analysis (i.e. a Monte Carlo simulation or the like), or randomly. Two or more target variables can optionally be selected for analysis. A computer, calculator, or other processing machine can be used to implement a method including one or more of the described aspects and/or optional variations.

Articles are also described that comprise a tangibly embodied machine-readable medium operable to cause one or more machines, such as for example calculators, computers, other programmable devices, and the like, to result in one or more of the operations described herein. Similarly, computer systems and the like are also described that may include a processor and a memory coupled to the processor. The memory may include one or more programs that cause the processor to perform one or more of the operations described herein.

Various implementations and features of the subject matter described herein can provide one or more benefits and advantages. Among other potential benefits, the current subject matter provides mathematical equation(s) that can be used to directly and spontaneously describe relationships between income statements, closed and/or open economic systems, and accounting equations. These equations can be used to describe spontaneous and direct relationship between closed and open economic systems that involve critical variables such as assets, liabilities, equity, revenue, income, and expenses, and profit/loss. Use of mathematical descriptions for complex and often confusing concepts in economics can make such concepts easier to comprehend and apply, particularly since mathematics is a universal language that does not need to be translated to be understood. Mathematical symbols and equations also present information in clear and unbiased terms that are not prone to comprehension errors that can easily exist in verbal explanations of such concepts. Among other potential benefits, the present subject matter can also provide a means for immediately observing variations and fluctuations of one or more variables effecting an economic system and for predicting and or visualizing the effects of potential responses or reactions to the variations or fluctuations.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The attached drawings illustrate various features of one or more potential implementations of the presently disclosed subject matter. Like reference symbols in the drawings may indicate similar features.

DETAILED DESCRIPTION

The subject matter described herein can be used to analyze, evaluate, improve and/or predict the performance of economic systems of nearly any scale, from personal, to business and even national or international. An equation is provided that links the effects of the variables that can impact the state, performance, and/or stability of an economic system and thereby allow for evaluation of the impacts of changes in one or more variables on projected economic performance. Among other potential uses and benefits, systems, techniques, computer implemented methods, and the like can be used to apply this subject matter to unify measurements associated with a closed economic system with variables associated with an open economic system. One or more quantitative tools can be used to described the spontaneous and direct relationship between a closed and an open economic system.

These quantitative tools can be used to predict possible future outcomes including but not limited to economic successes or failures, bankruptcies, and modifications according to certain legal and/or economic restrictions such as financial shortages, embargoes and the like. Potential uses can be found in a variety of fields, including but not limited to economics, eco-politics, and the like.

Figure 1:
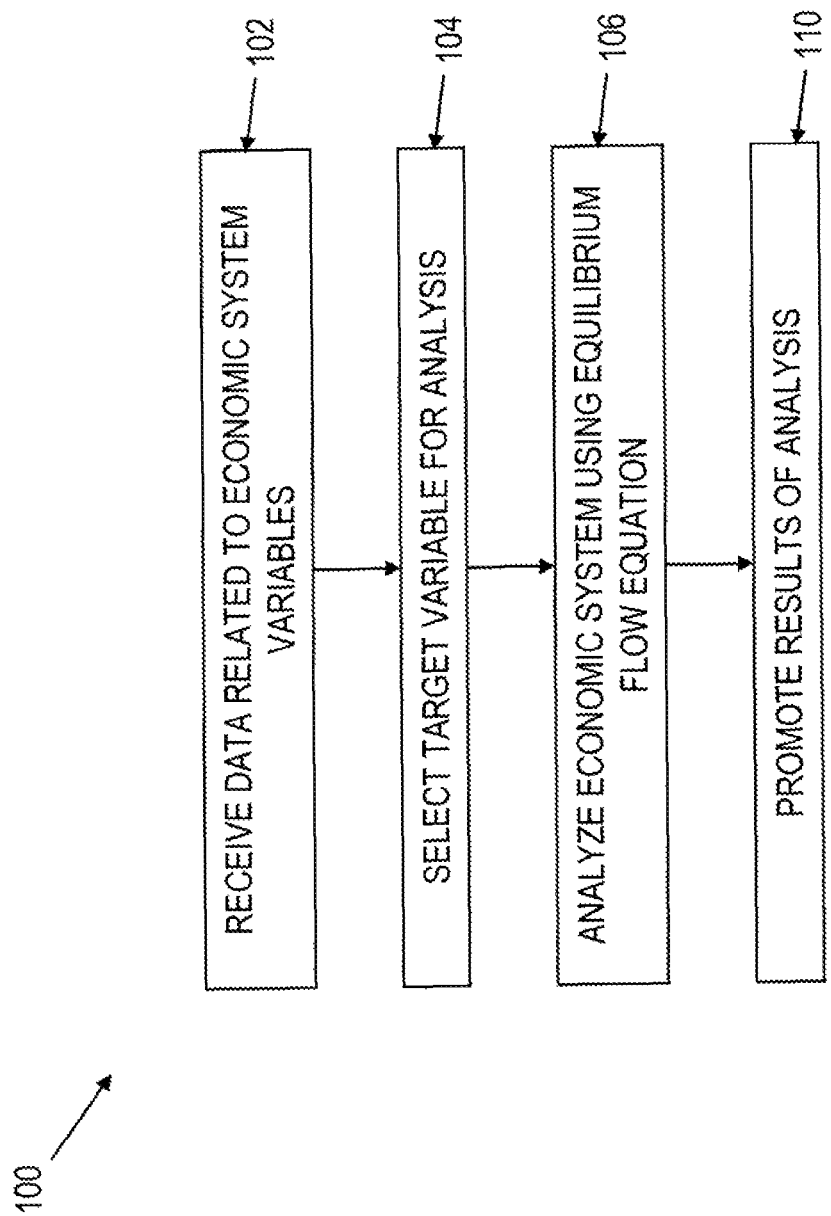
FIG. 1 is a process flow diagram illustrating a method for characterizing, analyzing, and/or and modifying an economic system.

FIG. 1 shows a flow chart illustrating a process by which the current subject matter can be used to analyze an economic system. This process can be implemented on a computer or calculator, or by other means, such as for example by hand calculations. Data related to one or more variables indicative of the current state of an economic system can be received at 102, such as for example by user input, transmission of a machine readable signal from one or more databases or data collection devices, by reading data encoded on one or more machine readable media, or the like. One or more target variables can be selected at 104 for analysis. These target variables can optionally include one or more of revenue (I), profit/loss (P), expenses ($E_o$), assets (A), liabilities (L), and equity (Eq) for the economic system. Selection of the target variable or variables can optionally be made by a user via a user interface, by a computer program or other automated means that makes the selection either randomly or according to an analysis algorithm, as part of a stochastic analysis (i.e. a Monte Carlo simulation or the like), or by other comparable means. At 106, the economic system is then analyzed using an equilibrium flow equation as discussed in greater detail below. Results of the calculations can then be promoted at 110.

Promotion can include presenting predictions, projections, suggestions, calculation results, input and output data for one or more variables and/or a first second, or higher derivative in tabular, graphical, numerical, or some other form to a user via a user interface, such as for example a graphical user interface on a computer screen. Promotion could also optionally include providing a printout of results of the calculations. In another optional aspect, calculation results can be further processed, modified, developed, expanded upon, or the like by one or more additional computer programs, either on the same processor that executes the above-described method or on another system that can include one or more other processors, computers, or the like either individually, via a networked processing system, or other means.

One aspect of the subject matter presented herein is an equilibrium flow equation for economic systems. The equilibrium flow equation combines aspects of closed and open economic systems to provide a clear representation of the influences of changes in economic variables on the state of an economic system.

Figure 2:
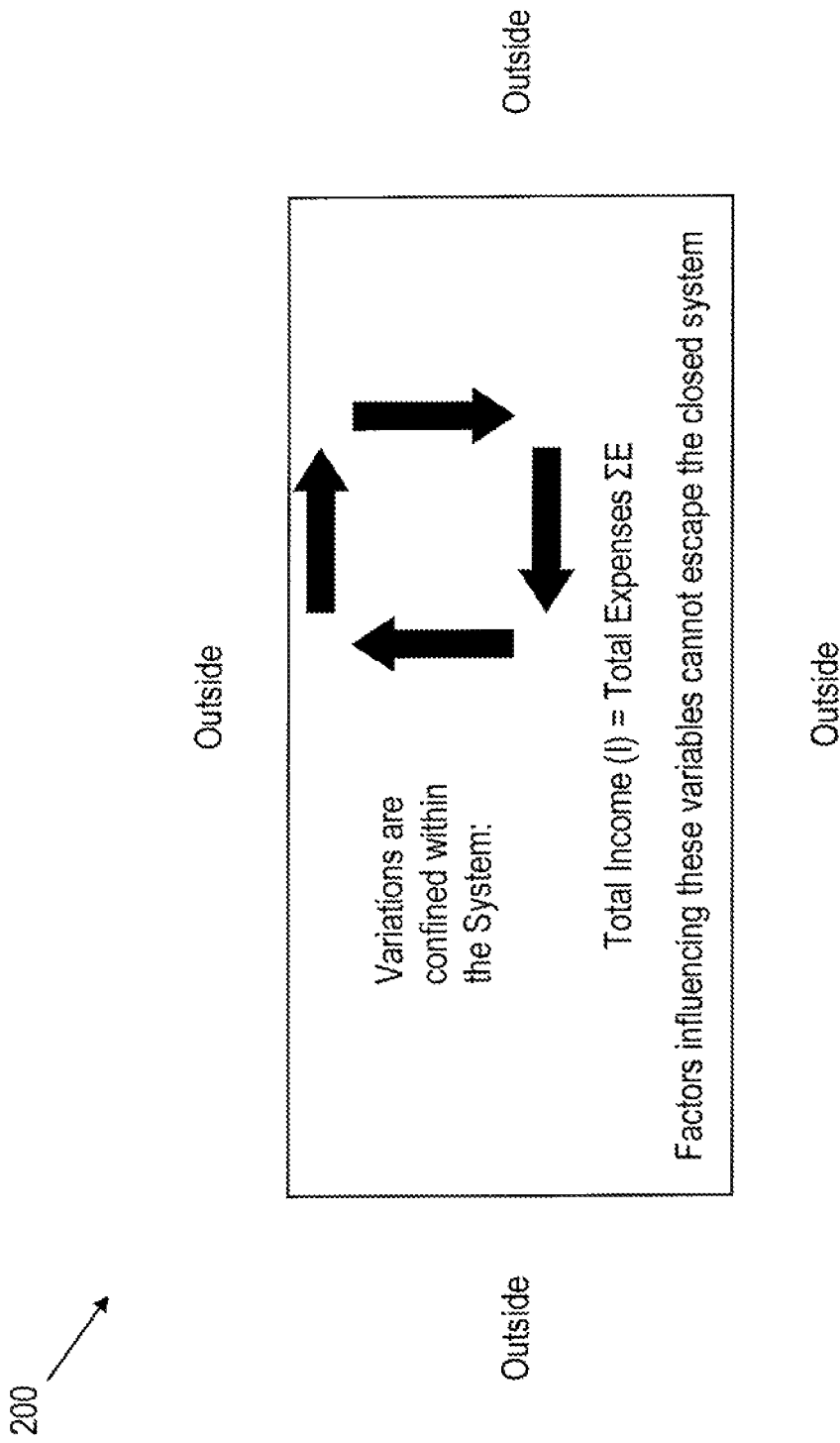
FIG. 2 is a diagram illustrating aspects of a closed economic system.

In a closed economic system, an example of which is shown in the diagram 200 of FIG. 2, the total income (or income) is generally equal to the total expenses. Fluctuation of the income is exactly proportional to the fluctuation of the told expenses and vice versa. The inter-relationship is a direct one—factors effecting one variable have the same effect on the other side of the equation (total income or total expenses alone). Fluctuations are proportional between the variables. The influential factors of two variables (income vs. total expenses) cannot escape out of this closed system. A closed system can be summarized by the phrase "eat what you kill." There is no accumulation of value in the system. Inputs equal outputs. A closed system can be described by a balanced equation:

$$I = \Sigma E \quad (1)$$

where I is the gross income or revenue and $\Sigma E$ is the total expenses. Among other expenses, the total expenses E can include one or more of administrative costs, marketing, management (employee's salaries), product costs, and the like.

Figure 3:
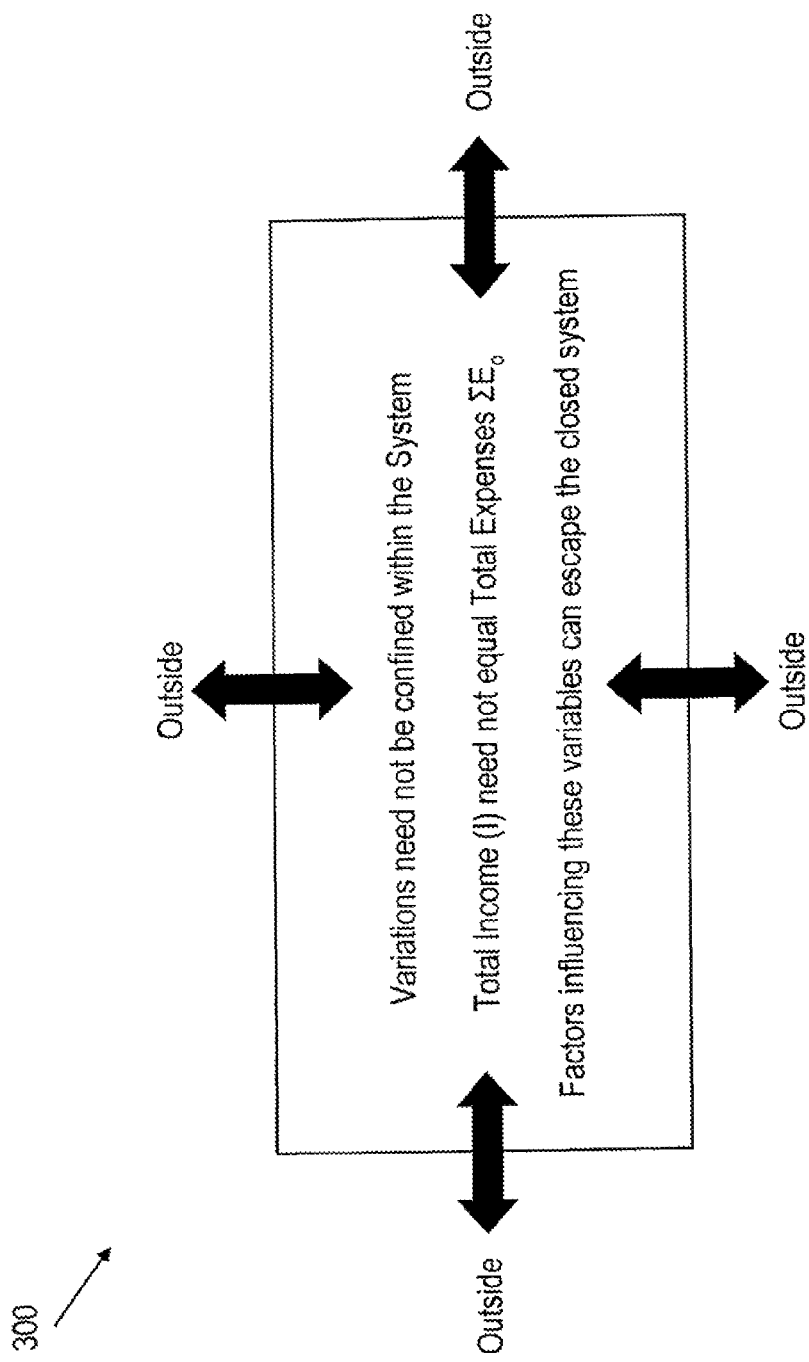
FIG. 3 is a diagram illustrating aspects of an open economic system.

In an open economic system, an example of which is shown in the diagram 300 of FIG. 3, the income and expenses are not necessarily equivalent or proportional. Fluctuation of the income need not be proportional to the fluctuation of the total expenses and visa versa. One variable can be dominant over others in terms of total impact on the system. The inter-relationship between the variables can be unbalanced. Various influential factors can interfere with a single variable, for example income or expenses, or with several variables. A closed system can be summarized by the phrase "we eat what we want not what we kill." Accumulation and decline of value can occur in the open system. The open system can provide a "flow" relationship for fluctuation, adaptation, and modification of the system that is balanced. The "flow" and equal balance sign make up the name "equilibrium flow."

In an open system, profits can occur. These are denoted as P. Equation 1 then becomes $$I = P + \Sigma E_o \quad (2)$$

which is composed of expenses, $E_o$, and profits, P, that can be negative if the sum of the expenses ($E_o$) exceed revenue, such as for example if a business or other economic system realizes a loss. To synchronize such closed and open system concepts, addition variables are needed to account for changes in assets, liability and equity in the open system. An accounting equation that does not reflect cash flows relates these three variables as follows:

$$A = L + Eq \quad (3)$$

where A is assets, L is liabilities, and Eq is equity or owner's equity. Equation 3 can provide a mathematical relationship for a system between the assets and the liabilities with equity. After algebraic manipulation, Equation 1 can be expressed as $$\frac{A}{L + Eq} = 1 \quad (4)$$

and equation 2 can be expressed as $$\frac{I}{P + \Sigma E_o} = 1 \quad (5)$$

Setting equations 4 and 5 equal then yields $$\frac{I}{P + \Sigma E_o} = \frac{A}{L + Eq} \quad (6)$$

which is the equilibrium flow equation that is used to make the calculations discussed above. Because equation 6 is an equality, variation of one or more variables generally causes other variables to vary with it, either proportionally or inversely proportionally. Variations for an economic system can be quickly identified and their impacts observed whether the system is open or closed. Among other potential uses, analysis of the impacts of the variables in equation 6 can provide economic system modeling that can be used to anticipate changes in the values of variables, to determine how to respond to observed changes, and/or to predict how a given response will impact the system. In one implementation, variations in each variable in equation 6 can be analyzed using a limit analysis to determine the threshold effect of the variable. Equations 7 through 12 isolate the impact of changes in the system on a single variable and allow analyses of the behavior of the system at its limits:

$$I = \frac{A(P + \sum E_o)}{L + Eq}, \quad \text{Lim } f(I) = \text{Lim}\left[\frac{A(P + \sum E_o)}{L + Eq}\right] \quad (7)$$

$$\sum E_o = \frac{I(L + Eq)}{A} - P, \quad \text{Lim } f\left(\sum E_o\right) = \text{Lim}\left[\frac{I(L + Eq)}{A} - P\right] \quad (8)$$

$$P = \frac{I(L + Eq)}{A} - \sum E_o, \quad \text{Lim } f(P) = \text{Lim}\left[\frac{I(L + Eq)}{A} - \sum E_o\right] \quad (9)$$

$$A = \frac{I(L + Eq)}{P + \sum E_o}, \quad \text{Lim } f(A) = \text{Lim}\left[\frac{I(L + Eq)}{P + \sum E_o}\right] \quad (10)$$

$$L = \frac{A(P + \sum E_o)}{I} - Eq, \quad \text{Lim } f(L) = \text{Lim}\left[\frac{A(P + \sum E_o)}{I} - Eq\right] \quad (11)$$

$$Eq = \frac{A(P + \sum E_o)}{I} - L, \quad \text{Lim } f(Eq) = \text{Lim}\left[\frac{A(P + \sum E_o)}{I} - L\right] \quad (12)$$

The total revenue I is applicable to virtually any economic system from the personal level to the national or even global level. In general, the higher the revenue level for a system, the greater the potential for sub-variations which can impact the variables in equation 6. Income categories used with the current subject matter can include but are not limited to those listed in Table 1, which presents various potentially applicable scenarios to which the present subject matter could be applied.

TABLE 1

Examples of income categories.

| Category | Description | Notice |
|---|---|---|
| Individual | Personal Income | Can be gross or net income |
| Company/Corporation | Gross income | |
| City | City Gross Income | |
| County | City Gross Income | |
| State | State Gross Product (in terms of income) | A type of income |
| Country | Gross national Product (in terms of income) | A type of income |
| World | Gross World Product (in terms of income) | A type of income |

The subject matter described herein may be embodied in systems, apparatus, methods, and/or articles depending on the desired configuration. In particular, various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, calculators, and the like (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not require the particular order shown, or sequential order, to achieve desirable results. Other embodiments may be within the scope of the following claims.

What is claimed is:

1. A method comprising:

receiving, at one or more programmable processors, data related to one or more variables characteristic of an economic system, the one or more variables being selected from a group consisting of revenue (I), profit/loss (P), expenses ($E_0$), assets (A), liabilities (L), and equity (Eq) for the economic system;

selecting, by the one or more programmable processors, a target variable for analysis;

analyzing, by the one or more programmable processors, the economic system using an equilibrium flow equation as follows:

$$\frac{I}{P+\sum E_0} = \frac{A}{L+Eq},$$

the analyzing comprising predicting an economic impact of an event on one or more economic fundamentals of the economic system; and promoting by the one or more programmable processors, one or more results of the analysis.

2. A method as in claim 1 wherein the event changes the value of one or more of the one or more variables.

3. A method as in claim 1, wherein the promoting comprises displaying results of the analysis to a user via a user interface.

4. A method as in claim 1, wherein the receiving comprises receipt of data entered by a user via a user interface in response to one or more prompts.

5. A method as in claim 1, wherein the receiving comprises receipt of data conveyed by a machine readable signal or on a machine-readable medium.

6. A method as in claim 5, wherein the data are supplied from one or more databases that record economic data representative of the economic system.

7. A method as in claim 1, wherein the target variable is selected for analysis by a user via a user interface.

8. A method as in claim 1, wherein the target variable is selected for analysis by a automated means.

9. A method as in claim 8, wherein the automated means makes the selection according to an analysis algorithm, as part of a stochastic analysis (i.e. a Monte Carlo simulation or the like), or randomly.

10. A method as in claim 1, wherein two or more target variables are selected for analysis.

11. A method as in claim 1, wherein the analyzing comprises a limit analysis to determine a threshold effect of the target variable and predict how a change in the target variable impacts the economic system.

12. An article comprising a machine-readable medium embodying instructions that when performed by one or more machines result in operations comprising:

receiving, at the one or more machines, data related to one or more variables characteristic of an economic system;

selecting, by the one or more machines, a target variable for analysis;

analyzing, by the one or more machines, the economic system using an equilibrium flow equation as follows:

$$\frac{I}{P+\sum E_0} = \frac{A}{L+Eq}$$

where I is revenue, P is profits, $E_0$ is expenses, A is assets, L is liabilities, and Eq is equity for the economic system, the analyzing comprising predicting an economic impact of an event on one or more economic fundamentals of the economic system; and promoting, by the one or more machines, one or more results of the analysis.

13. A system comprising:

a processor and a memory, wherein the processor and the memory are configured to perform operations comprising:

receiving, at the processor, data related to one or more variables characteristic of an economic system;

selecting, by the processor, a target variable for analysis;

analyzing, by the processor, the economic system using an equilibrium flow equation as follows:

$$\frac{I}{P+\sum E_0} = \frac{A}{L+Eq}; \text{ and}$$

where I is revenue, P is profits, $E_0$ is expenses, A is assets, L is liabilities, and Eq is equity for the economic system, the analyzing comprising predicting an economic impact of an event on one or more economic fundamentals of the economic system; and promoting, by the processor, one or more results of the analysis.

14. A system as in claim 13, further comprising a user interface via which a user can selected the target variable for analysis.

15. A system as in claim 13, further comprising a user interface via which a the results of the analysis are presented to a user.

16. A system as in claim 13, further comprising means for receiving the data related to the one or more variables.

17. A system as in claim 16, wherein the means for receiving the data comprises a mechanism that reads information coded on a machine-readable medium.

18. A system as in claim 16, wherein the means for receiving data comprises a wired or wireless connection configured to receive a machine-readable signal from a database comprising the data related to the one or more variables.

19. A system as in claim 13, wherein two or more target variables are selected for analysis.

* * * * *